United States Patent [19]

Chichester et al.

[11] 4,451,095

[45] May 29, 1984

[54] AUXILIARY RELEASE DEVICE FOR A HYDRAULIC PRESSURE RELEASABLE BRAKE

[75] Inventors: Willard L. Chichester; Dean E. Davis, both of Battle Creek, Mich.

[73] Assignee: Clark Equipment Company, Buchanan, Mich.

[21] Appl. No.: 386,855

[22] Filed: Jun. 10, 1982

[51] Int. Cl.³ .............................................. B60T 15/16
[52] U.S. Cl. ........................................ 303/71; 303/85
[58] Field of Search ................. 137/625.37, 627.5; 303/6 M, 9, 10, 13, 29, 68, 70, 71, 85, 89

[56] References Cited

U.S. PATENT DOCUMENTS

| | | | |
|---|---|---|---|
| 3,107,126 | 10/1963 | Valentine | 303/13 |
| 3,879,091 | 4/1975 | Bridwell et al. | 303/71 |
| 3,897,115 | 7/1975 | De Geeter et al. | 303/71 |
| 4,119,355 | 10/1978 | Kreitner | 303/85 |

Primary Examiner—Duane A. Reger
Attorney, Agent, or Firm—John C. Wiessler

[57] ABSTRACT

An auxiliary release apparatus for use with a hydraulic pressure releasable brake having a principal source of hydraulic pressure which comprises an auxiliary source of hydraulic pressure selectively connectible to the brake for releasing the brake when the principal source of hydraulic pressure is not operating. The auxiliary release apparatus includes a manual pump device for interrupting communication between the normal pressure source and the pressure releasable brake when the pressure source, as a pump, is not operating, and for manually pumping through a by-pass circuit pressure fluid to the pressure releasable brake.

9 Claims, 2 Drawing Figures

AUXILIARY RELEASE DEVICE FOR A HYDRAULIC PRESSURE RELEASABLE BRAKE

BACKGROUND OF THE INVENTION

This invention relates generally to hydraulic pressure devices and more particularly to a hydraulic pressure device adapted for use as an auxiliary release apparatus for a hydraulic pressure releasable brake having a principal source of hydraulic pressure when the principal source of pressure is not operating.

A normally engaged brake that is released or disengaged by hydraulic pressure comprises a simple and practical means for providing an emergency or parking brake that is energized in the event of hydraulic failure or shut-down. Thus, by relieving the hydraulic pressure to the brake, a driven or otherwise rotating member can be held in a fixed position. This type of brake has a wide range of applications, as for example between a hydraulic motor and a gear box. Additionally, such a brake may be suspended or hung from the end of a hydraulic motor or other source of power, or may be used in vehicle power trains, machine tools, cable wheels, several mechanism applications and generally as a brake on any rotating shaft.

When a failure occurs in a system using such a brake in the hydraulic system connected to the brake, the brake is automatically applied and thus the shaft to which the brake is attached cannot be rotated until hydraulic pressure is once again restored. In many cases it will be desirable to release the brake by use of an auxiliary source of pressure before the principal source of pressure is returned to operation. For example, should a hydraulic failure occur in a vehicle equipped with such a brake, it would be desirable to release the brake so that the vehicle could be towed or pushed from the area where the failure occurred to an appropriate area to repair the hydraulic system.

U.S. Pat. Nos. 3,746,403 and 4,119,355 are relevant prior art to the present invention. U.S. Pat. No. 4,119,355 is designed to accomplish a similar result and function, but by significantly different structure.

It is a principal object of the present invention to provide an improved auxiliary release device for a normally engaged hydraulic pressure releasable brake.

DESCRIPTION OF THE PREFERRED EMBODIMENT

Figure 1:
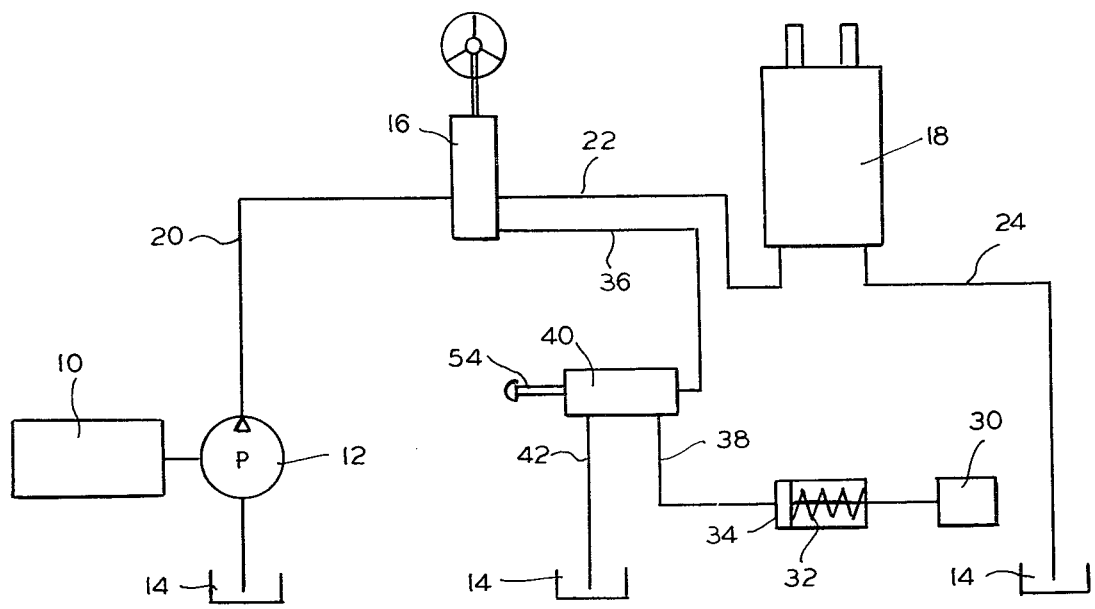
FIG. 1 is a schematic view of a hydraulic brake circuit which includes an auxiliary brake release device in accordance with this invention.

In a vehicle such as a fork lift truck having a mechanically applied, hydraulically released parking brake it is desirable to be able to move the vehicle, for example, when the prime power source is inoperative. The FIG. 1 hydraulic circuit exemplifies the use of such a parking brake wherein a prime mover is represented at numeral 10 from which a power take-off drives a hydraulic pump 12 which is connected to a reservoir 14 on the intake side and communicates with, for example, a vehicle hydraulic steering device 16, and a hydraulic control valve 18 for operating such components as lift and tilt cylinders on the lift truck by way of conduits 20, 22 and 24. A parking brake 30 is normally engaged by the operation of a spring 32 in a brake cylinder 34, the head end of which is in communication with pump discharge pressure when pump 12 is in operation by way of conduits 20, 36 and 38, and a circuit through steering device 16 and a parking brake release valve 40 which is also connected to reservoir 14 by conduit 42.

The hydraulic brake release valve 40 comprises a valve body 50 having a bore 52 therethrough, a manually actuatable plunger 54 inserted in the one end of bore 52 in sealing relationship therewith, a spool valve element 56 in said bore connected to plunger 54 by a stem 58 in sliding relationship to an opening 60 in spool stem 56, said stem 58 having an enlarged end 62 for actuating the spool leftwardly under certain conditions, and a spring 64 mounted in chamber 66 formed between the plunger and spool in bore 52, plunger stem 58 functioning as a retainer for said spring. A fitting 68 having an opening 70 therein is connected to the discharge side of the pump by way of conduits 36 and 20 through the steering device 16 and forms a chamber 72 in bore 52 with spool 56. The spool has two annular spaced detents 74 and 76 connected by annular passage 80 in the outer wall thereof adapted to cooperate with a spring loaded detent ball 78 as shown. Passageways 82, 84 and 86 are formed in the valve body communicating respectively with chambers 66 and 72 and between passages 82 and 84. A relief valve 88 is located between passages 82 and 84, and a reverse flow check valve 90 is mounted in an extension of passage 82 which cooperates with a channel in a housing plug 92 which is connected to reservoir 14 by conduit 42 and to a passage insert 94 which cooperates with ball check 90 under certain conditions. A housing plug 96 having a passage therein is connected to brake cylinder 34 by conduit 38 for communicating under normal conditions of operation pump discharge pressure to the cylinder via passageway 84.

In operation, spool 56 is normally held by ball detent 78 in groove 74 so that the parking brake is engaged when pump 12 is inoperative and is disengaged when the engine or drive motor 10 is in operation and drives the pump, the pump discharge being communicated via conduits 20, 36 and 70 to brake cylinder 34 to compress spring 32 and disengage the brake.

Figure 2:
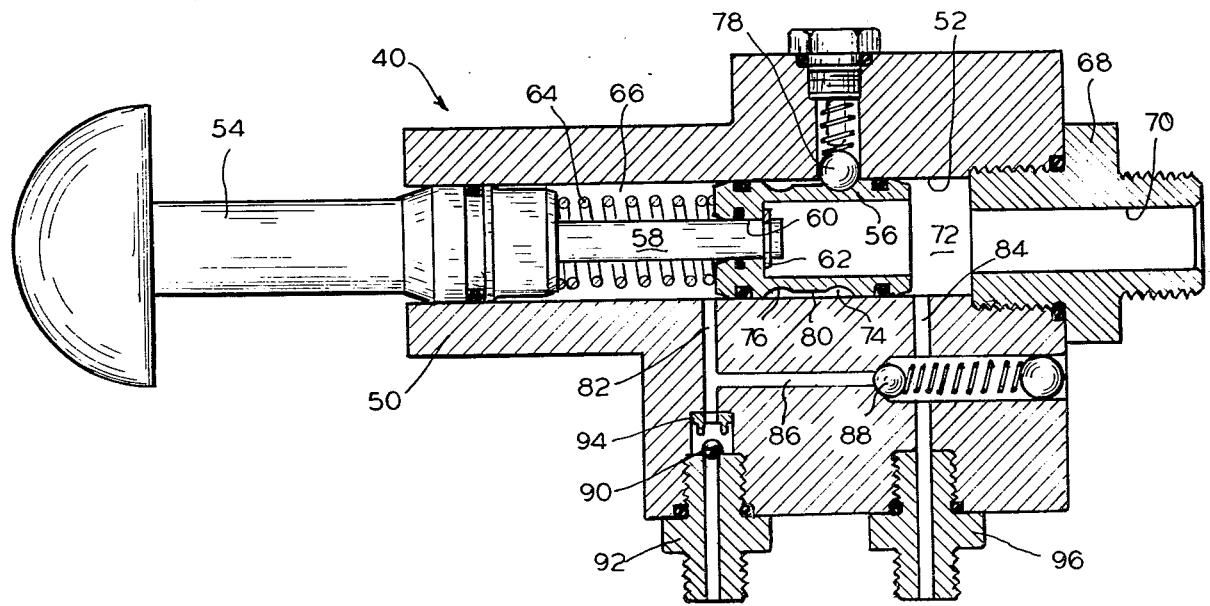
FIG. 2 is a sectional view of the auxiliary brake release valve which is embodied in the FIG. 1 circuit.

If it is desired to release the brake when the truck is inoperative and the engine or drive motor is not running, plunger 54 may be manually actuated to the right as seen in FIG. 2 to compress spring 64 and drive spool 56 to its second detent position wherein ball 78 engages groove 76 and the spool covers passageway 84 during the first portion of plunger actuation. Hydraulic fluid in chamber 66 is pressurized which maintains check valve 90 in the position shown to close off the reservoir from communication with chamber 66, and which pressure fluid actuates relief valve 88 so that the fluid is directed through plug 96 and conduit 38 to pressurize cylinder 34 and release the brake. Plunger 54 will recycle by the action of pump spring 64 to permit the operator to pump plunger 54 several times, if required, for the purpose of releasing the brake. When plunger 54 recycles, fluid is drawn from the reservoir through the port of check valve 90 and passage 82 into chamber 66 whereupon the same operation as above described may be repeated.

Subsequent to movement of the lift truck while in an inoperative condition the operator has the option to release the brake either by starting the engine or drive motor or by pulling plunger 54 to the left (which pulls spool 56 leftwardly therewith to its illustrated detent position by means of plunger stem end 62) whereby conduit 38 is again communicated with the pump which allows spring 32 of cylinder 34 to eject the fluid therein to the pump via passages 84 and 70 and conduits 38, 36 and 20, thereby applying the brake. On the other hand, the operator may simply start the engine or drive motor which then communicates the pump discharge with chamber 72 to actuate spool 56 leftwardly to the detent position illustrated in FIG. 2, thereby recommunicating the pump with cylinder 34 to release the brake.

It will be apparent to those skilled in the art that various changes in the structure and relative arrangement of parts may be made without necessarily departing from the scope of our invention. Accordingly, it should be understood that we intend to cover by the appended claims all such modifications which fall within the scope of our invention.

We claim:

1. A normally activated hydraulic pressure releasable brake having a primary hydraulic pressure source, an auxiliary hydraulic pressure souce, and a valve means responsive to said primary source and to said auxiliary source operatively connected to said brake for allowing said auxiliary source to release the brake and simultaneously disconnect said primary source from the brake when the primary source is not delivering pressure to the valve means and for disconnecting the auxiliary source from the brake and allowing the primary source to release the brake when the primary source is delivering pressure to the valve means and the auxiliary source is not delivering pressure thereto, said valve means comprising a two-position spool valve responsive to said primary source on one side thereof and to said auxiliary source on the opposite side thereof, a manually acuatable pumping element operatively connected to the spool valve on one side thereof to generate said auxiliary source pressure when the primary source is not delivering pressure to the opposite side of said spool valve, and detent means for locating said spool valve in the first position in which primary source pressure is delivered to said brake and in a second position wherein auxiliary source pressure is delivered to said brake.

2. A brake as claimed in claim 1 wherein said detent means comprises a ball detent adapted to cooperate with first and second axially spaced annular grooves in the outer wall of said spool valve.

3. A brake as claimed in claim 1 wherein resilient means is located in a chamber form between the one end of said spool valve and an opposed end of said manual pump.

4. A brake as claimed in claim 1 wherein said manual pump comprises a plunger for generating pressure in the chamber form between the plunger and the one end of said spool valve, said chamber being connected to a reservoir in such a manner that pressure fluid generated thereby is directed to said brake when the plunger is actuated toward said spool valve and said plunger intakes fluid from a reservoir when it is actuated away from said spool valve.

5. A brake as claimed in claim 1 wherein an axially projecting stem of relatively small diameter products from said plunger through the one end wall of said spool valve for inward sliding engagement therewith when the plunger is actuated toward said spool valve for generating said auxiliary source pressure and for establishing a one-way mechanical connection when the plunger is actuated in the opposite direction for pulling said spool valve in the latter direction of actuation of said plunger.

6. A brake as claimed in claim 1 wherein valve passages adjacent opposite ends of said spool valve are adapted to communicate alternately the primary and auxiliary source pressures to said brake, the spool valve being adapted to actuate to close the primary source passage when the auxiliary source is generated.

7. A brake as claimed in claim 6 wherein said spool valve has two detent positions one of which locates the spool axially betwen said passages and the other of which locates said spool to cover the primary source pressure passage.

8. A brake as claimed in claim 6 wherein said manual pump element is adapted to actuate said spool valve to both said detent positions.

9. A brake as claimed in claim 6 wherein said spool valve is actuatable by said primary source pressure to said first detent position axially between said first and second passages.

* * * * *